United States Patent
Swafford et al.

(10) Patent No.: US 7,434,020 B2
(45) Date of Patent: Oct. 7, 2008

(54) OVERWRITE DETECTION DIAGNOSTIC FOR MEMORY HEAP

(75) Inventors: Michael Swafford, Bellevue, WA (US); Kevin Charles Chase, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 10/750,455

(22) Filed: Dec. 31, 2003

(65) Prior Publication Data

US 2005/0144412 A1    Jun. 30, 2005

(51) Int. Cl.
*G06F 12/14* (2006.01)
(52) U.S. Cl. .................. 711/170; 726/22; 717/127
(58) Field of Classification Search ............. 711/170; 726/22; 717/127
See application file for complete search history.

(56) References Cited

U.S. PATENT DOCUMENTS

| | | | | |
|---|---|---|---|---|
| 5,809,554 | A | * | 9/1998 | Benayon et al. ............ 711/171 |
| 6,092,168 | A | * | 7/2000 | Voigt ........................ 711/170 |
| 7,181,585 | B2 | * | 2/2007 | Abrashkevich et al. ...... 711/170 |
| 2001/0013094 | A1 | * | 8/2001 | Etoh et al. ................. 712/227 |
| 2003/0120858 | A1 | * | 6/2003 | March et al. ............... 711/103 |

OTHER PUBLICATIONS

Microsoft Computer Dictionary; 2002; Microsoft Press; fifth edition; pp. 249-250.*

Robertson, William et al., Run-time Detection of Heap-Based Overflows, Oct. 31, 2003, Proceedings of the 17th Large Installation Systems Administration Conference, pp. 51-59.*

Rajesh Gupta, Tasks and Task Management, 2002, retreived from internet Mar. 15, 2007 <http://www1.ics.uci.edu/~rgupta/ics212/w2002/tasks.pdf>.*

Eigler, Frank Ch., Mudflap: PointerUse Checking for C/C++, May 29, 2003, retreived from internet Aug. 9, 2007 <http://www.linux.org.uk/~ajh/gcc/gccsummit-2003-proceedings.pdf>, Proceedings of the GCC Developers Summit, pp. 57-69.*

Wagle, Perry and Cowan, Crispin, StackGuard: Simple Stack Smash Protection for GCC, May 29, 2003, retreived from internet May 15, 2008, <url: http://people.redhat.com/dnovillo/pub/tree-ssa/papers/gccsummit-2003-proceedings.pdf>, Proceedings of the GCC Developers Summit, pp. 244-256.*

K. Nilsen; *Garbage Collection of Strings and Linked Data Structures in Real Time;* Received Feb. 26, 1987, Revised Nov. 25, 1987 and Jan. 20, 1988; Software—Practice and Experience, vol. 18(7), Jul. 1988; pp. 613-640.

Taesoon Park, Sungbok Cho and Heon Y. Yeom; *An Efficient Logging Scheme for Recoverable Distributed Shared Memory Systems*; Abstract; 1997 IEEE; pp. 305-313.

(Continued)

*Primary Examiner*—Kevin Ellis
*Assistant Examiner*—Jared I Rutz
(74) *Attorney, Agent, or Firm*—Merchant & Gould

(57) ABSTRACT

A data structure within a block of allocable memory of a memory structure such as a heap is used to store an overwrite detection pattern. When memory is passed back to the operation system for any reason (typically freeing the memory, reallocating a larger/smaller buffer, or querying the size of the allocation), the overwrite detection pattern is usually checked. If the overwrite pattern has been modified, an access violation can be forced.

27 Claims, 6 Drawing Sheets

OTHER PUBLICATIONS

Ronald Veldema, Ceriel J.H. Jacobs, Rutget F.H. Hofman and Henri E. Bal; Department of Mathematics aand Computer Science; *Object Combining: A new aggressive optimization for Object Intensive Programs*; JGO'02, Nov. 3-5, 2002; pp. 1-10.

Arthur D. Applegate; *Preventing, Detecting, and Fixing Windows Memory Bugs*; Windows/DOS Developer's Journal, Jun. 1992; pp. 13-21.

Cay S. Horstmann; *C++ debugging tools for DOS and Windows Programming*; Jul.-Aug. 1994; pp. 52-58.

Colin Runciman and Niklas Rojemo; *Two-Pass Heap Profiling: A Matter of Life and Death*; Abstract; pp. 222-232.

Mark Smith; *Freeware from the East*; Feb. 1999; pp. 51-52.

Matt Pietrek; *Under the Hood*; Microsoft Systems Journal Oct. 1998; pp. 83-89.

John H.G. van Groningen; *Optimizing Recursive Functions Yielding Multiple Results in Tuples in a Lazy Functional Language*; 2000; pp. 59-76.

\* cited by examiner

OVERWRITE DETECTION DIAGNOSTIC FOR MEMORY HEAP

BACKGROUND OF THE INVENTION

Many computer applications and operating systems use a heap-based memory-allocation scheme to manage the usage of memory resources within a computer system. For example, an application process can request a block of memory from the heap for its own use and then return control of the block of memory when the application has finished using the block. All too often, a process can cause problems with the heap by mishandling protocols associated with the heap and/or corrupting memory stored on the heap.

Heap corruptions/memory problems can take many forms including random overwrites, buffer overruns, "double frees," and memory "leaks." Random overwrites typically occur when a process references already freed memory or when other errors cause pointers to be misdirected. Buffer overruns typically occur when a process allocates a block of memory that is too small and writes over and beyond the end of the allocated block. Double frees occur when a process frees the same buffer twice, which leads to the possibility of the freed block of data being allocated twice. Memory leaks may occur, for example, when an application repeatedly requests more memory space (often while not efficiently using the memory space it has already allocated).

Heap corruptions are typically one of the most difficult types of bugs to locate and identify. Because of the dynamic nature of the heap, they are often difficult to reproduce and/or to document because traces of the corruption may be erased before the source of the problem is identified. Furthermore, heap corruptions may occur in systems that are being used by customers, which can complicate attempts at debugging and maintenance. What is needed is a mechanism to improve the diagnostic capabilities of system tools for maintenance and debugging heap corruptions and memory problems.

SUMMARY OF THE INVENTION

The present invention is directed towards providing overwrite detection diagnostics for dynamic memory such as heap memory in computer systems.

According to one aspect of the invention, a method for providing overwrite detection for an allocable memory block comprises receiving a request for performing one of requesting the allocable memory block, requesting the size of the allocable memory block, and freeing the allocable memory block. An overwrite detection pattern for the allocable memory block is generated. The overwrite detection pattern is stored in the allocable memory block.

According to another aspect of the invention, a computer-readable medium having computer-executable components for overwrite detection within an allocable memory block comprises three components. The first component is arranged to receive a request for performing one of requesting the allocable memory block, requesting the size of the allocable memory block, and freeing the allocable memory block. The second component is arranged to generate an overwrite detection pattern for the allocable memory block. The third component is arranged to store the overwrite detection pattern in the allocable memory block.

According to yet another aspect of the invention, a system for overwrite detection in an allocable memory block comprises a computer memory, a routine a memory allocator, a pattern generator, and an allocable memory block formatter. The computer memory comprises a heap in which allocable memory blocks can be allocated and freed. The memory allocator is arranged to receive a request for performing one of requesting the allocable memory block, requesting the size of the allocable memory block, and freeing the allocable memory block. The pattern generator is arranged to generate an overwrite detection pattern for the allocable memory block. The allocable memory block formatter is arranged to store the overwrite detection pattern in the allocable memory block.

DETAILED DESCRIPTION OF THE PREFERRED EMBODIMENT

The present invention is directed towards providing a data structure within a block of allocable memory of a memory structure such as a heap in which an overwrite detection pattern is stored. The overwrite detection pattern may be overwritten (erroneously) by code that writes to improper memory locations within the heap. When memory is passed back to the operation system for any reason (such as when freeing the memory, reallocating a larger/smaller buffer, or querying the size of the allocation), the overwrite detection pattern can be checked. If the overwrite pattern has been modified, an access violation can be forced. The overwrite detection pattern can be chosen to aid in debugging specific kinds of memory problems that may occur such as improper string termination, character set function problems, stuck (or cleared) bit problems, and the like. The overwrite detection pattern can be written within an area of the allocable memory block that is used for alignment purposes by the operating system.

Illustrative Operating Environment

Figure 1:
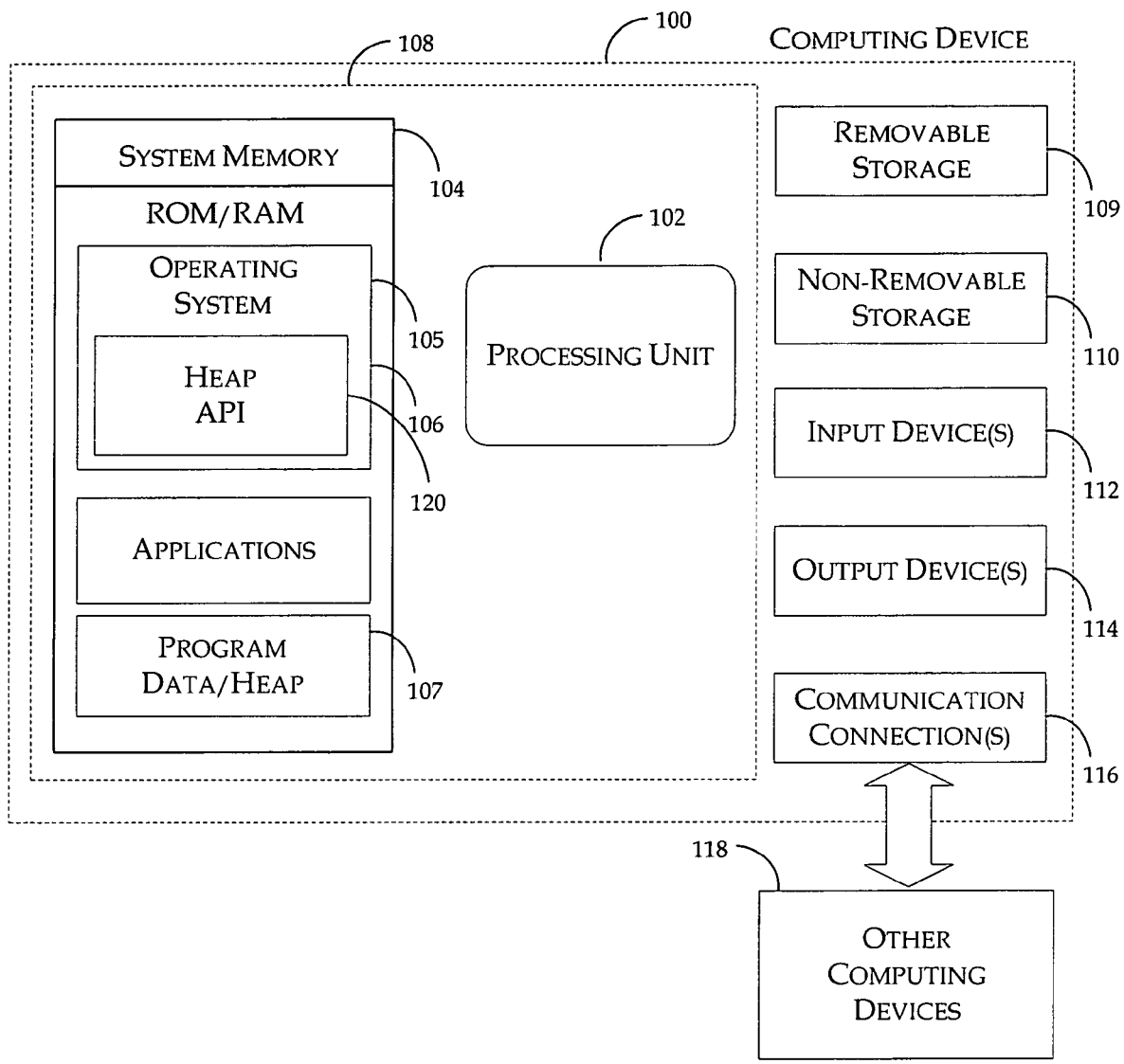
FIGS. 1 and 2 illustrate exemplary computing devices that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Program data 107 typically includes a heap and/or multiple heaps. In one embodiment, operating system 105 may include a heap API 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
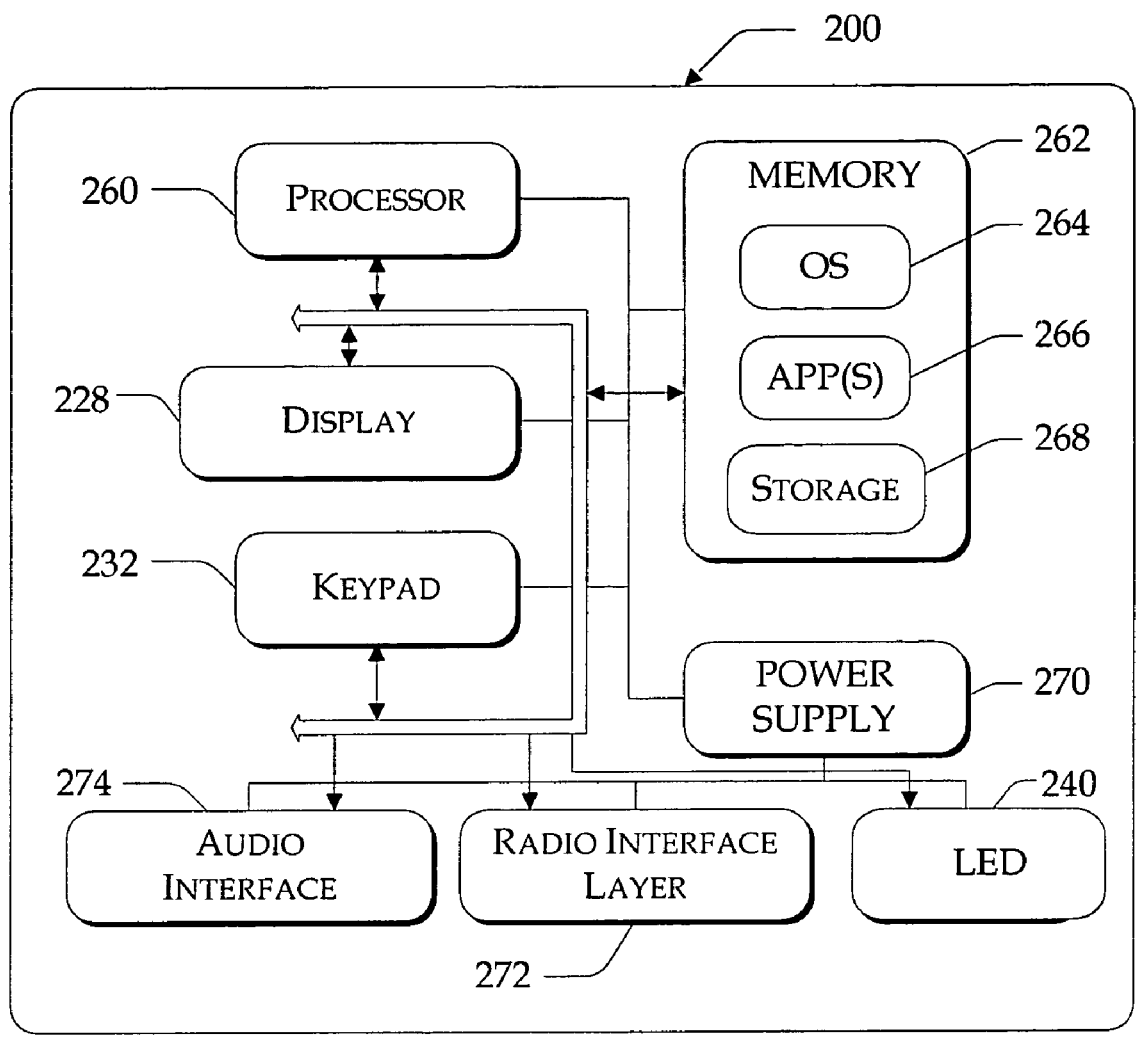

FIG. 2 illustrates a mobile computing device that may be used according to an exemplary embodiment of the present invention. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then could also act as an input device.

One or more application programs 266 are loaded into memory 262 and run on the operating system 264. A spell checking application resides on mobile computing device 200 and is programmed to provide operations relating to a spell checking operation. The spell checking application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes wireless interface layer 272 that performs the function of transmitting and receiving wireless communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Communications connections are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Dynamic Memory Heap System

Figure 3:
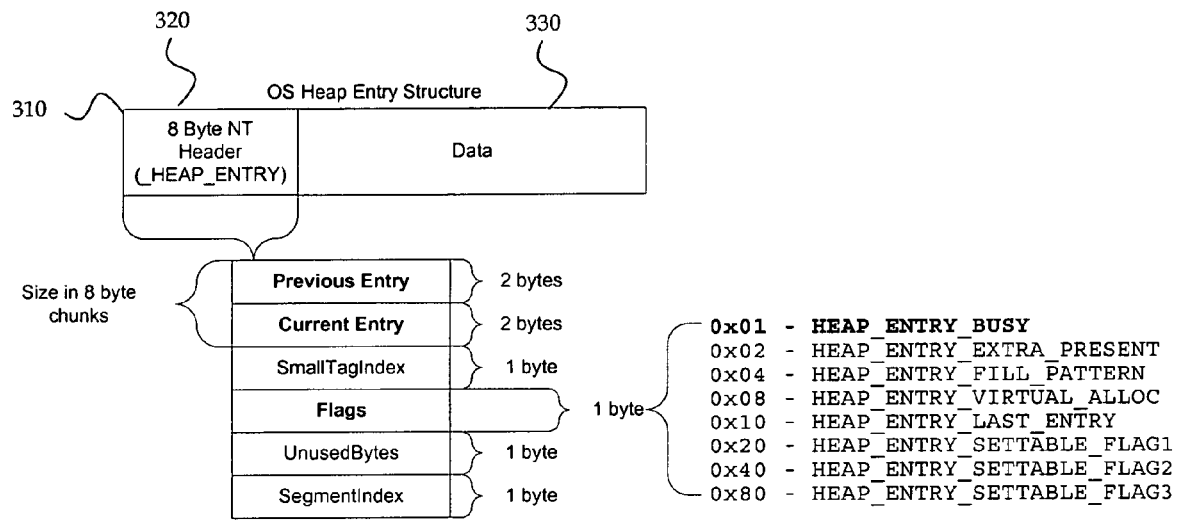
FIG. 3 is a data structure diagram generally illustrating a conventional heap entry structure that is used in accordance with aspects of the invention.

FIG. 3 is a data structure diagram generally illustrating a conventional heap entry structure that is used in accordance with aspects of the invention. Heap entry structure 310 is an example entry in a heap that is managed by a memory management system in computing devices such as the one described above in conjunction with FIG. 1 and/or mobile computing devices such as the one described above in conjunction with FIG. 2. The actual heap entry structure may vary in accordance with the various memory management systems used in different operating systems.

Heap entry structure 310 typically comprises header 320 and data field 330. Header 320 typically comprises byte-aligned information that is used for various bookkeeping information of the heap. The header comprises information such as Previous Entry, Current Entry, Tag Index, Flags, Unused bytes, and Segment Index.

In accordance with the present invention, an additional 8 bytes is added to the requested allocation size of a block of memory when memory is being allocated. The additional 8 bytes is used to store (in addition to other information) the return address to the caller that allocated the memory. The 8-byte header is representative for a 32-bit computer architecture. The example 8-byte header shown herein can be adapted to other architectures (such as a 64-bit architecture, for example) by lengthening or shortening the header structure accordingly.

Figure 4:
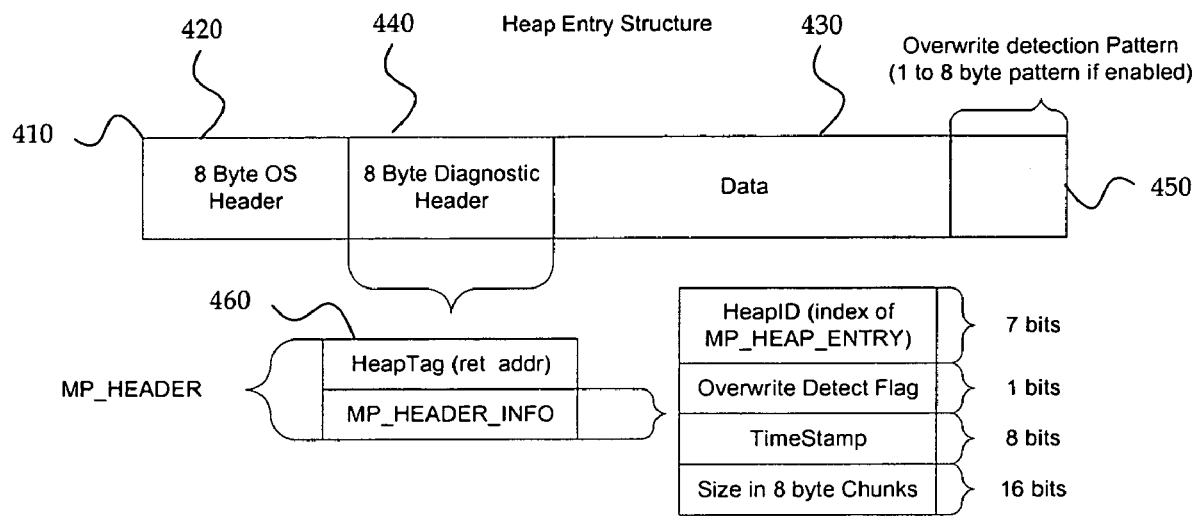
FIG. 4 is a data structure diagram generally illustrating a heap tag process identifier in a heap entry structure that is used in accordance with aspects of the invention.

FIG. 4 is a data structure diagram generally illustrating a heap tag function identifier in a heap entry structure that is used in accordance with aspects of the invention. Heap entry structure 410 typically comprises header 420, data field 430, diagnostic header 440, and optionally overwrite detection pattern 450. Diagnostic header 440 comprises heap tag 460 and optionally comprises other information such as miscellaneous header information, heap entry index, overwrite detect flag, timestamp, and size. The timestamp indicates the time when one of requesting and freeing the allocable memory block is performed. Heap tag 460 typically comprises the return address of the function that allocated the memory. In other embodiments, an identifier of the function that allocated the memory can be used such that the return function that allocated the memory can be later identified.

The return address can be obtained by "peeking" at one level up on the call stack. An example routine for obtaining the return address in x86 assembly language is given as follows:

```
DWORD_PTR
   __stdcall GetReturnAddress( )
{
    DWORD_PTR *pStack;
    DWORD_PTR *pStackOrig;
    __asm mov pStack, ebp
    pStackOrig = pStack;
    pStack = (DWORD_PTR *)*pStack;
    return *(pStack + 1);
}
```

The function can be stored as an API which can be called by a function.

If the function that allocated the memory is a wrapper function (which allocates memory on behalf of another process, such as the C++ "new" operator), then an API can be provided to peek two levels up the call stack to obtain the return address of the caller that invoked the wrapper.

The return address is used to assign code "ownership" to all memory that is allocated within various heap structures. Accordingly, any allocated block of memory within the heap that is identified as having a problem (such as a memory leak or being corrupted memory) can be associated with a particular code routine. The address stored in an allocated block of memory identifies the code that requested the allocated memory block. The address may be, for example, the return address of the function that requested the allocated memory block. Thus, if the memory block is associated with a problem, the address can be used to identify the source of the memory problem.

Additionally, the return address of the caller that requests that a block of memory be freed is obtained and stored (for example, in the freed memory block) before the freed memory block is returned to the operating system heap. The information can be used, for example, to identify (erroneous) multiple "frees" of the same memory block.

Figure 5:
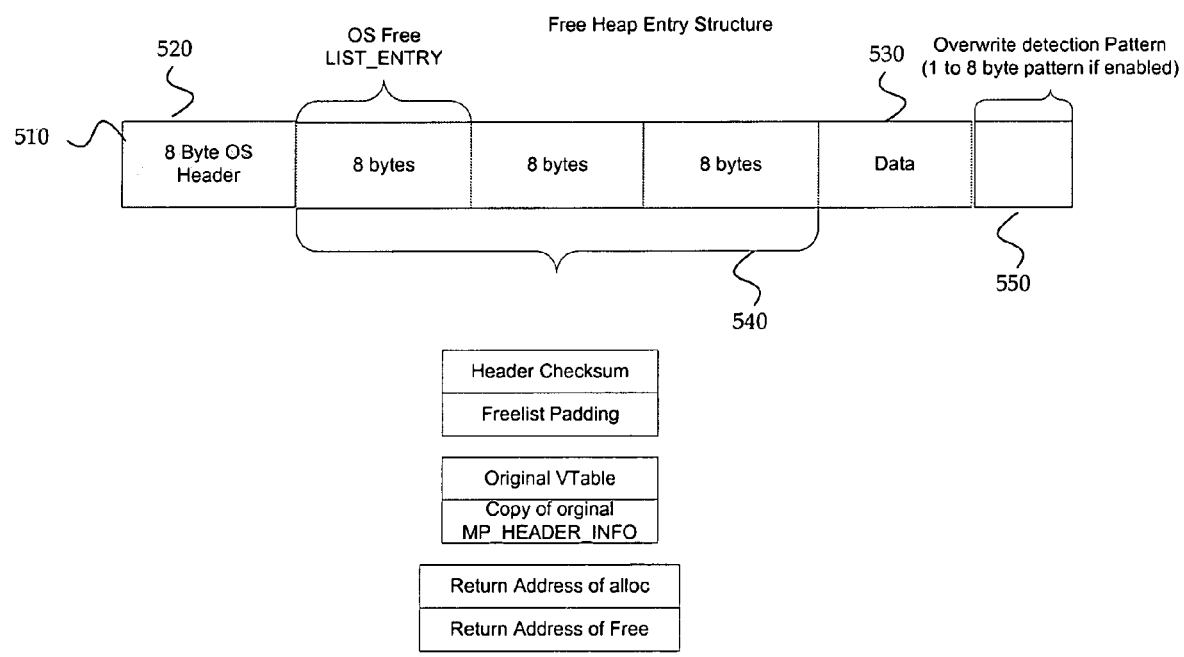
FIG. 5 is a data structure diagram generally illustrating a heap tag process identifier in a freed heap entry structure that is used in accordance with aspects of the invention.

FIG. 5 is a data structure diagram generally illustrating a heap tag process identifier in a freed heap entry structure that is used in accordance with aspects of the invention. Heap entry structure 510 typically comprises operating system (OS) header 520, data field 530, diagnostic header 540, and optionally overwrite detection pattern 550.

As shown in the figure, diagnostic header 540 typically comprises diagnostic information such as a checksum entry, an identifier of the code (or routine) that allocated the memory, and an identifier of the code (or routine that freed the memory.

The checksum can be formed by evaluating the contents of the free heap entry structure as originally written and re-evaluated at a later time to see whether, for example, data in the structure has been (erroneously) modified. For example, invariant sections of the memory block allocation are determined. The invariant sections are checksummed and the resulting checksum is written into the memory itself. A mechanism (such as a delayed freelist) can be used to defer returning the memory to the heap manager. Before actually freeing or reusing the memory, the checksum can be validated.

The identifiers for the routines that free or allocate the memory can be the return addresses of the routines (as described above with reference to FIG. 4).

The return address of every caller that frees a block of memory is typically stored in the freed block of memory such that the first double word (which may be a signature such as a C++ vtable) is not overwritten. Furthermore, the information should be written away from locations that are used by the operating system heap manager. The information can additionally be used to more easily detect modification of the memory after it has been freed.

Optionally, overwrite detection can be used in accordance with the present invention. For example, the optional overwrite detection pattern 450 and/or 550 can be used to detect whether a particular memory block has been overwritten. Typically heap memory block data structures are padded (if necessary) to eight-byte boundaries, which can leave up to seven bytes available for the pattern. Other dynamic memory allocators may pad differently, the scheme here can be adapted by lengthening or shortening the pattern accordingly. If a data structure is already block aligned (and not already padded), an extra eight bytes is requested in which the pattern is to be written.

Table 1 shows example patterns (in hexadecimal) for overwriting detection:

TABLE 1

| 8-(Size Mod 8) | Overwrite tail used |
| --- | --- |
| 1 | ?? ?? ?? ?? ?? ?? ?? 01 |
| 2 | ?? ?? ?? ?? ?? ?? 02 02 |
| 3 | ?? ?? ?? ?? ?? 03 03 03 |
| 4 | ?? ?? ?? ?? 04 04 04 04 |
| 5 | ?? ?? ?? 05 05 05 05 05 |
| 6 | ?? ?? 06 06 06 06 06 06 |
| 7 | ?? 07 07 07 07 07 07 07 |
| 8 | 08 08 08 08 08 08 08 08 |

If the allocation has overwrite detection enabled, a portion of the allocation can be reserved for the overwrite detection pattern. To save on space, a different pattern can be used for different allocation sizes. If the allocation size is not a multiple of eight, the size is usually rounded up to the next multiple of eight and the extra area is used for overwrite detection. If the size is a multiple of eight, then eight extra bytes are added. Since typical heap implementations only allow allocation in eight-byte increments, extra memory for allocations is only needed for memory blocks that are multiples of eight bytes already.

When memory is passed back to the operation system for any reason (typically freeing the memory, reallocating a larger/smaller buffer, or querying the size of the allocation), the overwrite detection pattern is typically checked. If the overwrite pattern has been modified, an access violation can be forced and the code that has caused the bug can be easily identified (instead of, for example, hitting a random crash a few minutes later).

The pattern shown in Table 1 encodes the size of the pattern within in the last byte of the pattern, which enables the appropriate pattern to be ascertained readily. The pattern contains characters that are not typically used as part of the ASCII character ser, which facilitates detection of string overruns. The pattern does not contain the NUL (e.g., '\0') character, which is a very common 1-byte overrun caused by failure to allocate space for the terminating NUL character of a string.

Table 2 shows additional example patterns (in hexadecimal) for overwriting detection:

TABLE 2

| 8-(Size Mod 8) | Overwrite tail used |
| --- | --- |
| 1 | ?? ?? ?? ?? ?? ?? ?? 42 |
| 2 | ?? ?? ?? ?? ?? ?? 42 61 |
| 3 | ?? ?? ?? ?? ?? 42 61 00 |
| 4 | ?? ?? ?? ?? 42 61 00 F7 |
| 5 | ?? ?? ?? 42 61 00 F7 06 |
| 6 | ?? ?? 42 61 00 F7 06 05 |
| 7 | ?? 42 61 00 F7 06 05 04 |
| 8 | 42 61 00 F7 06 05 04 0B |

Table 2 illustrates using portions (or the whole) of a pattern, which facilitates calculation of the pattern size. The NUL character is included after the first byte, which facilitates detection of problems associated with strings that have missing terminating NUL characters. The pattern also includes (where space permits) both upper and lower case characters, which helps in detection of errant "toupper" and "tolower" constructs. Additionally the logical OR of all the bytes in the overwrite detect pattern is 0xFF, which helps to highlight corruptions that arbitrarily clear any bit. (Any logical function that typically provides a predetermined result that can be compared against an expected value can be used to evaluate the integrity of the overwrite detection pattern.)

Figure 6:
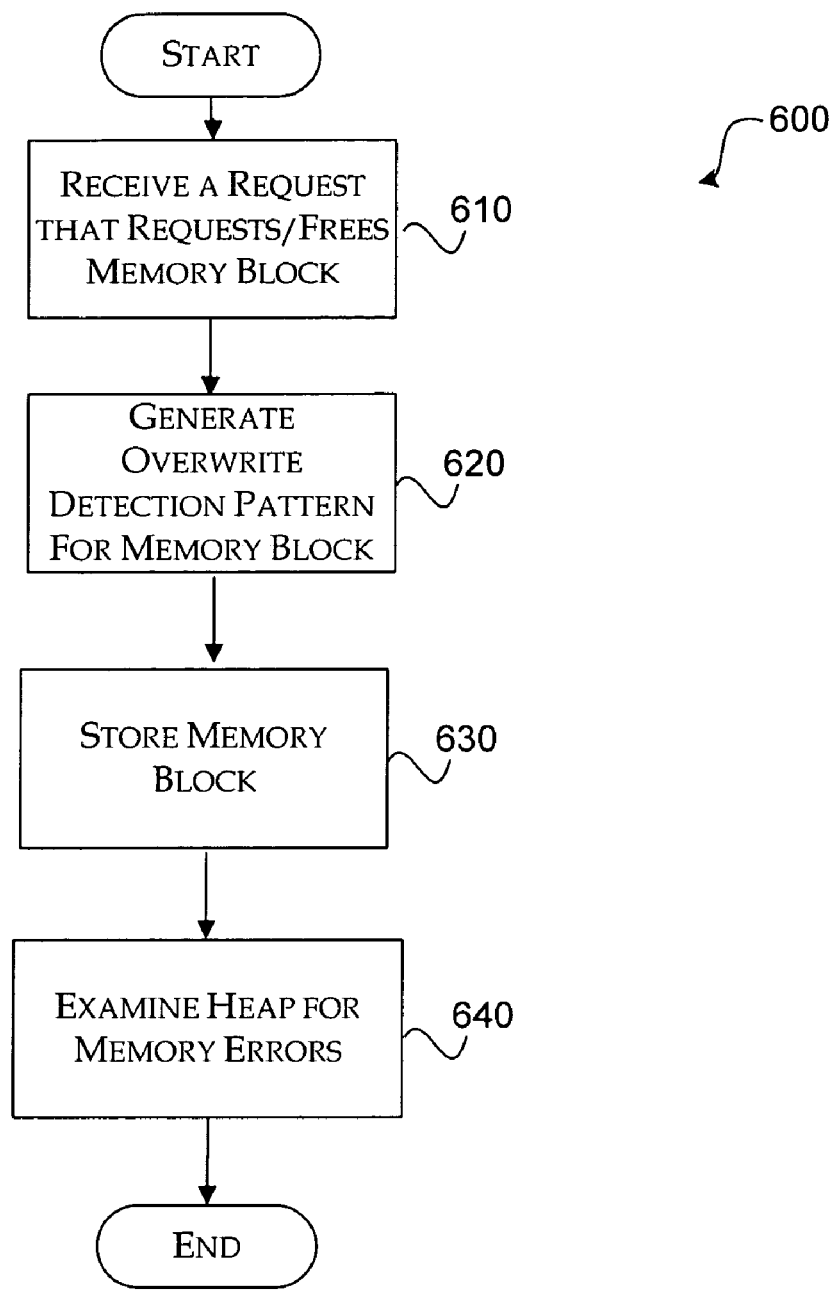
FIG. 6 is a flow diagram providing overwrite detection patterns in a heap entry structure that is used in accordance with aspects of the invention.

FIG. 6 is a flow diagram providing overwrite detection patterns in a heap entry structure that is used in accordance with aspects of the invention. The process 600 enters at block 610, where a request from a routine that requests (or frees) memory a memory block is received. The routine can be identified for example by examining a return address that is pushed onto the program stack.

In block 620, an overwrite detection pattern is generated for the allocable memory block. The pattern can be sized to use unoccupied memory space (resulting from, for example, operating system byte-alignment). At block 630, the overwrite detection pattern is stored. The overwrite detection pattern is stored with the requested/freed memory itself.

In block 640, the heap is examined for the presence of errors such as can take many forms including random overwrites, buffer overruns, "double frees," and memory leaks. The heap can be examined by a human using debugger routines and/or software routines that perform heuristics upon the stack. The routines can be performed while a system is "running" or the routines can be performed upon a "core dump" of the memory. Example automated routines can include validating checksums on allocated and/or freed memory blocks, evaluating overwrite detection patterns, and the like.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing overwrite detection for an allocable memory block, comprising:
   receiving a request for performing one of requesting the allocable memory block, requesting the size of the allocable memory block, and freeing the allocable memory block;
   performing a checksum on the allocable memory block;
   storing results of the checksum within the allocable memory block;
   generating an overwrite detection pattern for the allocable memory block based on a size of an area of the allocable memory block that is used for alignment purposes, wherein
      the area includes a number of memory units each including a plurality of bytes;
      a predetermined code is generated for one or more of the bytes in each of the memory units so that a change in the predetermined numeric code in one or more of the bytes of one or more of the memory units indicates a memory overwrite; and
      the predetermined code generated for the one or more bytes in each of the one or more memory units is different for each of the memory units;
   storing the overwrite detection pattern in the area of the allocable memory block used for alignment purposes, wherein the overwrite detection pattern is stored separately from the results of the checksum in the allocable memory block;
   checking the overwrite detection pattern; and
   forcing an access violation if one of the checksum is not valid and the overwrite detection pattern has been modified.

2. The method of claim 1, further comprising examining a heap to determine whether the overwrite detection pattern has been overwritten.

3. The method of claim 1, further comprising examining the results of the checksum to determine the presence of memory errors.

4. The method of claim 1, wherein the overwrite detection pattern is written at an end of the allocable memory block opposite another end of the allocable memory block where the results of the checksum are stored.

5. The method of claim 1, wherein a logical function of the elements within the overwrite detection pattern provides a predetermined result.

6. The method of claim 1, further comprising storing a heap index for the allocable memory block within the allocable memory block, wherein the heap index points to one of a plurality of heaps.

7. The method of claim 1, further comprising storing a timestamp within the allocable memory block, wherein the timestamp indicates the time when requesting the allocable memory block is performed.

8. The method of claim 1, wherein the overwrite detection pattern is checked when the allocable memory block is passed back to the operating system.

9. The method of claim 1, further comprising storing a timestamp within the allocable memory block, wherein the timestamp indicates the time when freeing the allocable memory block is performed.

10. A computer storage medium storing computer readable instructions for overwrite detection within an allocable memory block, comprising:
- a first component that is arranged to receive a request for performing one of requesting the allocable memory block, requesting the size of the allocable memory block, and freeing the allocable memory block;
- a second component that is arranged to generate an overwrite detection pattern for the allocable memory block wherein the overwrite detection pattern is written at an end of the allocable memory block opposite another end of the allocable memory block in which a header for the allocable memory block is stored and the overwrite detection pattern is based on a size of an area of the allocable memory block that is used for alignment purposes, wherein
  - the area includes a number of memory units each including a plurality of bytes;
  - a predetermined code is generated for one or more of the bytes in each of the memory units so that a change in the predetermined numeric code in one or more of the bytes of one or more of the memory units indicates a memory overwrite; and
  - the predetermined code generated for the one or more bytes in each of the one or more memory units is different for each of the memory units;
- a third component that is arranged to store the overwrite detection pattern in the area of the allocable memory block used for alignment purposes in the allocable memory block;
- a fourth component that is arranged to generate a checksum on the allocable memory block;
- a fifth component that is arranged to store results of the checksum in the header of the allocable memory block; and
- a sixth component that is arranged to store a heap index for the allocable memory block within the allocable memory block, wherein the heap index points to one of a plurality of heaps.

11. The computer storage medium of claim 10, further comprising an examination component that is arranged to examine one of the plurality of heaps heap to determine whether the overwrite detection pattern has been overwritten.

12. The computer storage medium of claim 10, further comprising a checksum examination component that is arranged to examine results of the checksum to determine the presence of memory errors.

13. The computer storage medium of claim 10, wherein the overwrite detection pattern is written at an end of the allocable memory block opposite another end of the allocable memory block where the results of the checksum are stored.

14. The computer storage medium of claim 10, wherein a logical function of the elements within the overwrite detection pattern provides a predetermined result.

15. The computer storage medium of claim 10, wherein the overwrite detection pattern is checked and an access violation is forced if the overwrite detection pattern has been modified.

16. The computer storage medium of claim 15, wherein the overwrite detection pattern is checked when the allocable memory block is passed back to the operating system.

17. The computer storage medium of claim 10, further comprising a timestamp component that is arranged to store a timestamp within the allocable memory block, wherein the timestamp indicates the time when requesting the allocable memory block is performed.

18. The computer storage medium of claim 10, further comprising a timestamp component that is arranged to store a timestamp within the allocable memory block, wherein the timestamp indicates the time when freeing the allocable memory block is performed.

19. A system for overwrite detection in an allocable memory block, comprising:
- a computer memory that comprises a heap in which an allocable memory block can be allocated and freed;
- a memory allocator that is arranged to receive a request for performing one of requesting the allocable memory block, requesting the size of the allocable memory block, and freeing the allocable memory block;
- a pattern generator that is arranged to generate an overwrite detection pattern for the allocable memory block based on a size of an area of the allocable memory block that is used for alignment purposes, wherein
  - the area includes a number of memory units each including a plurality of bytes;
  - a predetermined code is generated for one or more of the bytes in each of the memory units so that a change in the predetermined numeric code in one or more of the bytes of one or more of the memory units indicates a memory overwrite; and
  - the predetermined code generated for the one or more bytes in each of the one or more memory units is different for each of the memory units;
- an allocable memory block formatter that is arranged to store the overwrite detection pattern in the allocable memory block; and
- a memory timestamp system that is arranged to store a timestamp within the allocable memory block, wherein the timestamp indicates one of the time of one of the requesting of the allocable memory block and the freeing of the allocable memory block.

20. The system of claim 19, further comprising a memory verification system that is arranged to examine a heap to determine whether the overwrite detection pattern has been overwritten.

21. The system of claim 19, further comprising a memory verification system that is arranged to perform a checksum on the allocable memory block and storing results of the checksum within the allocable memory block.

22. The system of claim 21, further comprising a memory verification system that is arranged to examine the results of the checksum to determine the presence of memory errors.

23. The system of claim 21, wherein the overwrite detection pattern is written at an end of the allocable memory block opposite another end of the allocable memory block where the results of the checksum are stored.

24. The system of claim 19, wherein a logical function of the elements within the overwrite detection pattern provides a predetermined result.

25. The system of claim 19, wherein the overwrite detection pattern is checked and an access violation is forced if the overwrite detection pattern has been modified.

26. The system of claim 25, wherein the overwrite detection pattern is checked when the allocable memory block is passed back to the operating system.

27. The system of claim 19, further comprising a memory indexing system that is arranged to store a heap index for the allocable memory block within the allocable memory block, wherein the heap index points to one of a plurality of heaps.

* * * * *